United States Patent
Varadarajan et al.

(10) Patent No.: US 11,093,345 B1
(45) Date of Patent: *Aug. 17, 2021

(54) LOG-BASED ROLLBACK-RECOVERY

(71) Applicant: OPEN INVENTION NETWORK LLC, Durham, NC (US)

(72) Inventors: Srinidhi Varadarajan, Blacksburg, VA (US); Joseph F. Ruscio, Blacksburg, VA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/430,934

(22) Filed: Jun. 4, 2019

Related U.S. Application Data

(63) Continuation of application No. 14/152,806, filed on Jan. 10, 2014, now Pat. No. 10,310,947, which is a continuation of application No. 12/894,877, filed on Sep. 30, 2010, now Pat. No. 8,631,276, which is a continuation of application No. 11/424,350, filed on Jun. 15, 2006, now abandoned.

(60) Provisional application No. 60/760,026, filed on Jan. 18, 2006.

(51) Int. Cl.
*G06F 11/14* (2006.01)

(52) U.S. Cl.
CPC ...... *G06F 11/1458* (2013.01); *G06F 11/1438* (2013.01)

(58) Field of Classification Search
CPC .......................... G06F 11/1458; G06F 11/1438
USPC ........................................................ 714/19
See application file for complete search history.

(56) References Cited

U.S. PATENT DOCUMENTS

| | | |
|---|---|---|
| 5,410,685 A | 4/1995 | Banda et al. |
| 5,440,726 A | 8/1995 | Fuchs et al. |
| 5,530,802 A | 6/1996 | Fuchs et al. |
| 5,590,277 A | 12/1996 | Fuchs et al. |
| 5,630,047 A | 5/1997 | Wang |
| 5,632,032 A | 5/1997 | Ault et al. |
| 5,938,775 A | 8/1999 | Damani et al. |
| 5,996,088 A | 11/1999 | Frank et al. |
| 6,092,213 A | 7/2000 | Lennie et al. |
| 6,192,391 B1 | 2/2001 | Ohtani |
| 6,195,676 B1 | 2/2001 | Spix et al. |
| 6,625,751 B1 | 9/2003 | Starovic et al. |
| 6,856,950 B1 | 2/2005 | Abts et al. |
| 6,952,825 B1 | 10/2005 | Cockx et al. |
| 8,631,276 B2 | 1/2014 | Varadarajan et al. |
| 10,310,947 B1 * | 6/2019 | Varadarajan ........ G06F 11/1438 |
| 2002/0178169 A1 | 11/2002 | Nair et al. |
| 2004/0078618 A1 | 4/2004 | Moser et al. |

(Continued)

OTHER PUBLICATIONS

Anonymous; dictionary definition of "Forward Error Correction"; retrieved from https://en.wikipedia.org/wiki/Forward_error_correction; ; last downloaded on Jun. 18, 2017.

*Primary Examiner* — Yair Leibovich

(57) ABSTRACT

Log-Based Rollback Recovery for system failures. The system includes a storage medium, and a component configured to transition through a series of states. The component is further configured to record in the storage medium the state of the component every time the component communicates with another component in the system, the system being configured to recover the most recent state recorded in the storage medium following a failure of the component.

20 Claims, 5 Drawing Sheets

(56) References Cited

U.S. PATENT DOCUMENTS

| | | |
|---|---|---|
| 2004/0220981 A1 | 11/2004 | Taylor |
| 2005/0050386 A1 | 3/2005 | Reinhardt et al. |
| 2005/0050536 A1 | 3/2005 | Grieskamp et al. |
| 2005/0138461 A1 | 6/2005 | Allen et al. |
| 2006/0101083 A1 | 5/2006 | Cherkauer et al. |
| 2007/0050660 A1 | 3/2007 | Ferren et al. |
| 2008/0086730 A1* | 4/2008 | Vertes ................ G06F 11/3476 718/100 |
| 2008/0270838 A1 | 10/2008 | Dorai et al. |
| 2008/0301417 A1 | 12/2008 | Law et al. |
| 2012/0096441 A1 | 4/2012 | Law et al. |

\* cited by examiner

LOG-BASED ROLLBACK-RECOVERY

BACKGROUND

1. Field

The present disclosure relates generally to distributed systems, and more particularly, to systems and techniques for recovering from system failures in distributed systems.

2. Background

Computers and other modern processing systems have revolutionized the electronics industry by enabling complex tasks to be performed with just a few strokes of a keypad. These processing systems have evolved from simple self-contained computing devices, such as the calculator, to highly sophisticated distributed systems. Today, almost every aspect of our daily lives involves, in some way, distributed systems. In its simplest form, a distributed system may be thought of an individual computer capable of supporting two or more simultaneous processes, or a single process with multiple threads. On a larger scale, a distributed system may comprise a network with a mainframe that allows hundreds, or even thousands, of computers to share software applications. Distributed systems are also being used today to replace traditional supercomputers with any number of computers, servers, processors, or other components being connected together to perform specialized applications that require immense amounts of computations. The Internet is another example of a distributed system with a host of Internet servers providing the World Wide Web.

As we become more dependent upon distributed systems in our daily lives, it becomes increasingly important to guard against system failures. A system failure can be at the very least frustrating, but in other circumstances could lead to catastrophic results. For the individual computer, a system failure can result in the loss of work product and the inconvenience of having to reboot the computer. In larger systems, system failures can be devastating to the business operations of a company or the personal affairs of a consumer.

There are a number of system recovery techniques that are employed today to minimize the impact of system failures. One such technique is known as "rollback recovery." The basic idea behind rollback recovery is to model the operation of a system as a series of states, and when an error occurs, to roll back the system to a previous error-free state and resume operation. One technique for implementing rollback recovery is commonly referred as Checkpoint-Based Rollback Recovery. Using this technique, the system saves in a stable database some of the states it reaches during operation as "checkpoints," and when an error occurs, the system is restored to a previous error-free state from the checkpoints.

Log-Based Rollback Recovery is another technique that builds on the concept of Checkpoint-Based Rollback Recovery. In addition to checkpoints, this technique also uses information about non-deterministic events that occur between successive checkpoints. A non-deterministic event is generally an input to the system whose timing and content are unknown by system prior to receipt. However, for a given input and a given state in which the system receives this input, the execution of the system until the reception of the next input is deterministic. As a result, the execution of the system can be modeled as a sequence of deterministic state intervals, each initiated by a non-deterministic event. This follows the "piecewise deterministic" (PWD) assumption which postulates that all non-deterministic events that cause state transitions to the system can be recorded as determinants. When this assumption holds true, system recovery may be achieved by restoring the system to a previous prior error-free state based on the checkpoints, and then replaying the recorded determinants to restore the system to the state that existed just prior to the error.

Unfortunately, current Log-Based. Rollback-Recovery techniques have no mechanism to deal with certain types of non-determinism inherent in systems capable of handling multiple processes, or a single process with multiple threads, that share a common state (i.e., address space). As an example, consider a distributed system on the Internet in which two computers conducting an e-commerce transaction with a server compete to purchase the same item. In this example, a scheduling entity within the server will determine which computer is granted access first and, hence, is able to consummate the transaction. However, should a system failure occur and the server be rolled back to a previous error-free state that existed prior to the transaction, there is no guarantee that the same computer will be granted access to the server before the other without extremely invasive modifications to the operating system and/or applications. This can be especially problematic when the system fails after the server confirms the original transaction.

SUMMARY

In one aspect of the present invention, a system includes a storage medium, a component configured to transition through a series of states, and record in the storage medium the state of the component every time the component communicates with another component in the system, and recovery manager configured to recover the most recent state of the component recorded in the storage medium following a failure of the component.

In another aspect of the present invention, computer-readable media contains a set of program instructions executable by hardware in a component of a system while the component is transitioning through a series of states. The instructions include a routine to record in a storage medium the state of the component every time the component communicates with another component in the system.

In yet another aspect of the present invention, a method of checkpointing a component in a system while the component is transitioning through a series of states, includes recording in a storage medium the state of the component every time the component communicates with another component in the system, and recovering the most recent state recorded in the storage medium following a failure of the component.

In a further aspect of the present invention, a component configured to operate in a system includes means for transitioning through a series of states, and means for recording in a storage medium the state of the component every time the component communicates with another component in the system.

In yet a further aspect of the present invention, a processing node configured to operate in a system includes a processor configured to transition through a series of states, the processor having a checkpoint library configured to record in a storage medium the state of the processor every time the processor communicates with another component of the system.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompanying drawing, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The various techniques described throughout this disclosure may be applied to the constituent components of a distributed system to recover from a system failure, even in the presence of non-deterministic events that are too difficult or expensive to record. According to the PWD assumption, these non-deterministic events must be captured as determinants so the precise set of deterministic state intervals may be recreated. However, the following observation can also be made. The set of deterministic state intervals that occur in a component between any two interactions with the rest of the system appear to all other components in the system as a single deterministic interval. In other words, any non-determinism that occurs internal to one component does not affect any other component in the system until the one component communicates with the system. This communication would commonly take the form of a message passed between the one component and another component in the system, but could also be a modification to a shared file or some other Inter-Process Communication (IPC) mechanism. Thus, a globally consistent state can be reestablished after system failure without replaying the non-deterministic events internal to a component as long as a checkpoint is taken with any communication by the component with the rest of the system. Although the recovered state of the system may not be one that existed prior to the occurrence of the error, it is sufficient if the recovered state could have occurred in the system execution prior to the error.

Figure 1:
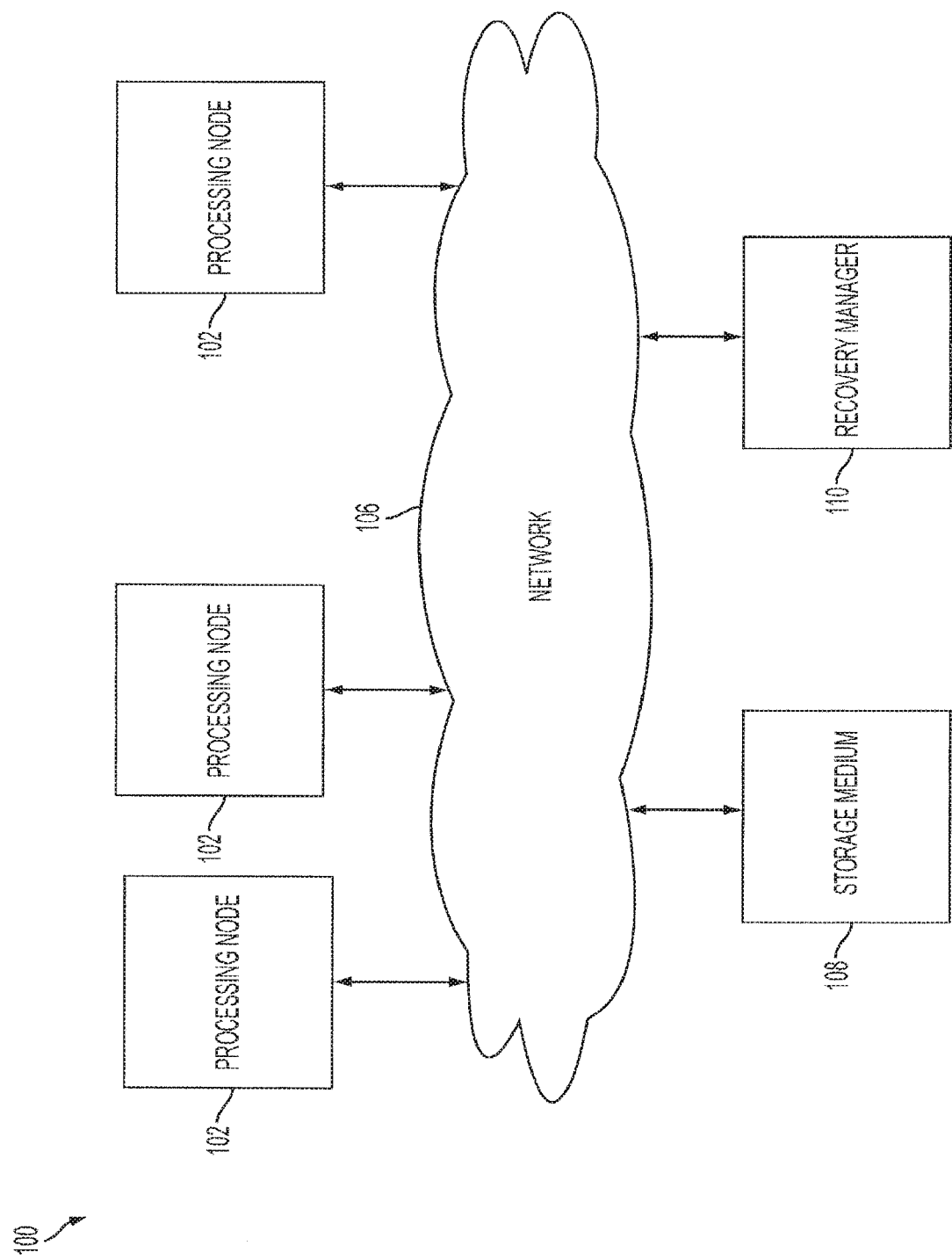
FIG. 1 is a conceptual block diagram illustrating an example of a distributed system.

The distributed system of FIG. 1 will be used to illustrate this concept. The distributed system 100 has a group of processing nodes 102 connected through a network 106. The network 106 may be a packet-base network, such as the Internet or corporate Intranet, or any other type of suitable network. The group of processing nodes 102 may be any combination of desktop computers, laptop computers, client workstations, server-enabled computers, dedicated servers, a mainframes, or other processing nodes.

A storage medium 108 is shown connected to the network 106. The storage medium 108 provides a stable database for each processing node 102 to record its current state every time a checkpoint is taken. When a processing node 102 fails, a recovery manager 110 may be used to load the state of the failed processing node 102 that existed when the last checkpoint was taken into a spare processing node 102. Alternatively, the recovery manager 110 may roll back the failed processing node 102 to that last checkpoint state and resume operation. Although the storage medium 108 and the recovery manager 110 are shown as separate entities on the network 106, those skilled in the art will readily appreciate that the storage medium 108 and recovery manager 110 may be integrated into a processing node 102 or other entity on the network 106, or distributed across multiple processing nodes 102 and/or other entities.

Figure 2:
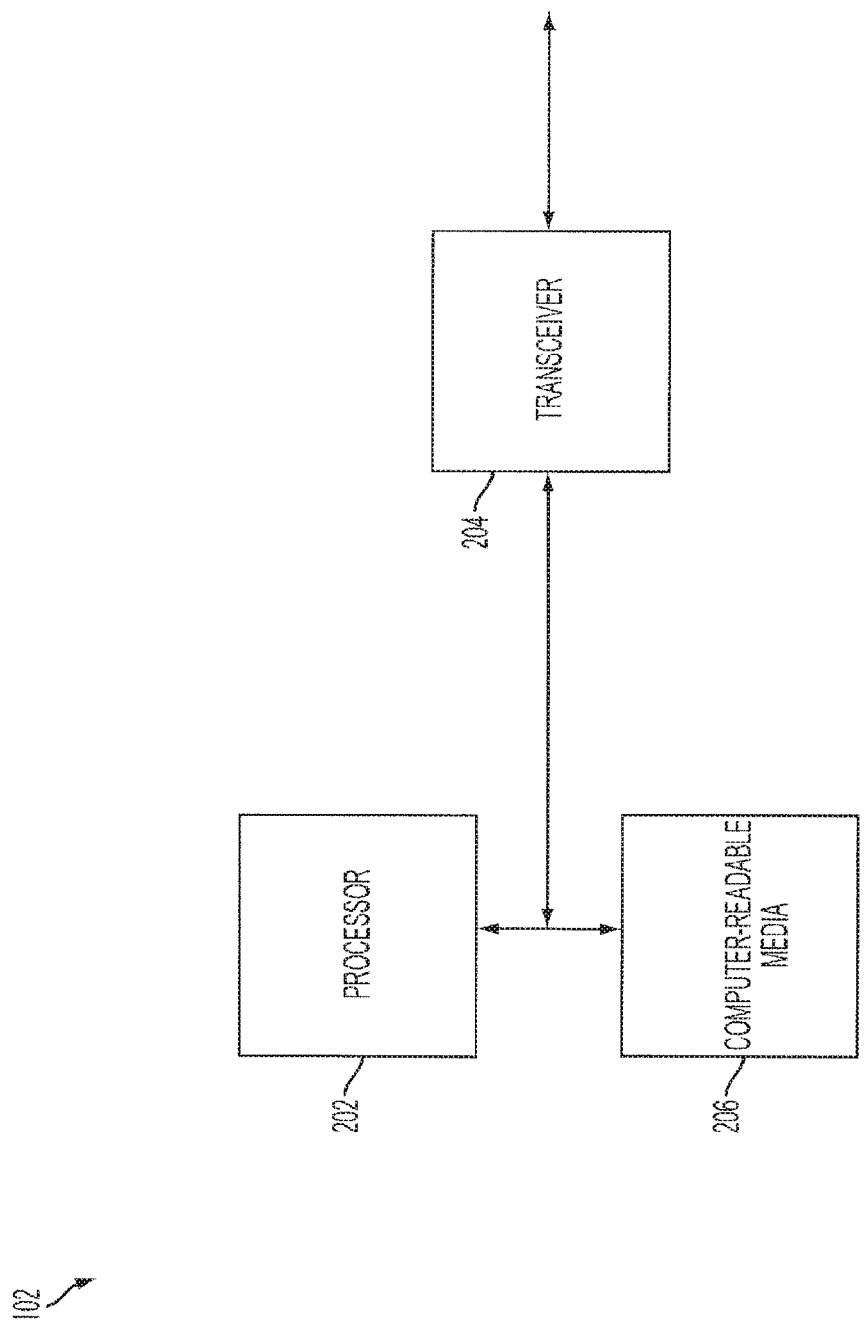
FIG. 2 is a block diagram illustrating an example of a hardware configuration for a processing node in a distributed system.

A conceptual block diagram of a processing node is shown in FIG. 2. The processing node 102 includes a processor 202 implemented with one or more processing entities. In one embodiment, the processor 202 includes a general purpose processor, such as a microprocessor, capable of supporting multiple software programs, including an operating system, user applications, and software libraries. The processor 202 may also include memory, which provides a temporary storage medium for the software programs used by the processor 202. The memory may be implemented with RAM, SRAM, SDRAM, or any other high speed volatile memory.

The processor 202 is shown connected to the network through a transceiver 204. The transceiver 204 may be capable of supporting any number of connections to the network, including Ethernet, T1, wireless, cable modem, DSL, fiber optic, or the like.

The processing node 102 may also include computer-readable media 206 that provides a permanent storage medium for the software programs. The computer readable media 206 may be implemented with magnetic hard drive, DVD, CD, CD ROM, tape backup, reel-to-reel, and/or any other inexpensive permanent memory capable of storing large amounts of data and software programs. Those skilled in the art will recognize that the term "computer-readable media" includes any type of storage device that is accessible by the processor 202 that encodes a data signal.

The manner in which each processing node 102 is implemented will depend on the particular application and the design constraints imposed on the overall system. Those skilled in the art will recognize the interchangeability of hardware, firmware, and software configurations under these circumstances, and how best to implement the described functionality for each particular application.

Figure 3:
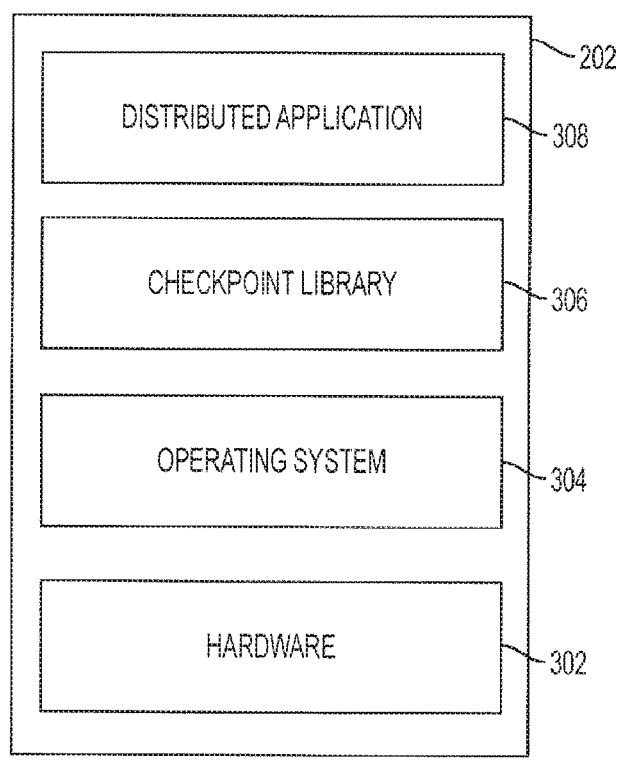
FIG. 3 is a conceptual block diagram illustrating an example of the communications layering for a processing node in a distributed system.

FIG. 3 is a conceptual diagram illustrating the layered architectural in the processing node. The processing node includes hardware 302 that supports the operating system 304 or other application execution environment. The operating system is shown running a user, or distributed application 308 that supports a distributed computation in the distributed system. A checkpoint library 306 is transparently interposed above the operating system 304 and below the distributed application 308 so that all checkpoint functions are processed through the checkpoint library 306. The checkpoint library is responsible for taking a checkpoint every time the processing node 102 communicates with the rest of the system over the network. The checkpoint is taken by recording the current state of the processing node 102 in a stable database (not shown) outside the processing node 102.

Returning to FIG. 1, the individual processing nodes 102 are constituent components of the distributed system 100. A globally consistent state can be reestablished after a processing node 102 fails without replaying the non-deterministic events internal to that processing node 102 as long as a checkpoint is taken every time the processing node 102 communicates with another processing node. When a processing node 102 fails, the state of the failed node 102 when the last checkpoint was taken can be recovered from the stable database and loaded into a spare processing node 102 on the network 106. The distributed computation can then continue. It does not matter that the recovered state of the distributed system is one that existed prior to the occurrence of the error. It is sufficient if the recovered state could have occurred in the system execution prior to the error.

An example will now be described with reference to a processing node 102 configured as a server that is capable of supporting e-commerce transactions with other processing nodes. In this example, Referring to FIG. 3, the processing node 102 receives a request over the network from two different processing nodes, or computers, attempting to purchase the same item. Once the requests are received, the checkpoint library 306 takes a checkpoint by recording the current state of the distributed application 308 to a stable database external to the processing node 102. The two requests are processed in parallel by separate threads of the distributed application 308. Each thread attempts to access the memory (not shown) to retrieve a state variable j relating to the item. In this example, j=1 if the item is still available, and j=0 if the item has been sold. The operating system 304 uses a scheduling algorithm to determine the order in which the two threads will have access to the state variable j. The first thread granted access by the operating system 304 will load the state variable j into a processor register (not shown), confirm that the item is still available (i.e., j=1), complete the transaction, and decrement the state variable j (i.e., set j=0) before writing it back to the memory. Once the transaction is complete, the checkpoint library 306 takes a checkpoint by recording the current state of the processing node 102 to the stable database. The state of the first thread includes the state variable j=1. The processing node 102 then sends a confirmation over the network to the computer requesting the transaction.

Next, the operating system 304 grants the second thread access to the state variable/in the memory. The second thread processes the state variable in the same way, but this time it will not be able to consummate the transaction because the item is no longer available (i.e., the state variable j=0). In this case, the processing node 102 will send a message over the network back to the requesting computer indicating that the item is unavailable.

Should the processing node 102 fail while the second thread is processing the request, the state of the processing node 102 when the last checkpoint was taken can be recovered from the stable database and loaded into a spare processing node on the network. In this case, the spare processing node is loaded with the state of the processing node 102 that existed just prior to the processing node 102 sending the confirmation over the network to the computer requesting the item. Once the spare processing node is loaded with this state, the second thread begins processing its request to purchase the item by loading the state variable j from its memory to a processor register. Since the state variable j recovered from the memory is zero, the request to purchase the item will be denied, thereby resulting in a globally consistent state (i.e., the item was not sold to both consumers).

A globally consistent state can be achieved even if the processing node 102 fails while the first thread is processing the request. Under this scenario, the spare processing node is loaded with the state of the processing node 102 immediately after the two requests to purchase the item were received, i.e., the state of the processing node 102 when the last checkpoint was taken. When the spare processing node resumes the transaction, it is possible that the second thread will be granted access to the state variable j before the first thread. If this occurs, then the item will be sold to the consumer whose request is being processed by the second thread. Although this result is different than the one that would have occurred had the processing node not failed, it is still a globally consistent state because the item is sold to only one consumer. The consumer whose request was being processed by the first thread does not receive an inconsistent message because the processing node 102 failed before he or she received a confirmation.

Figure 4:
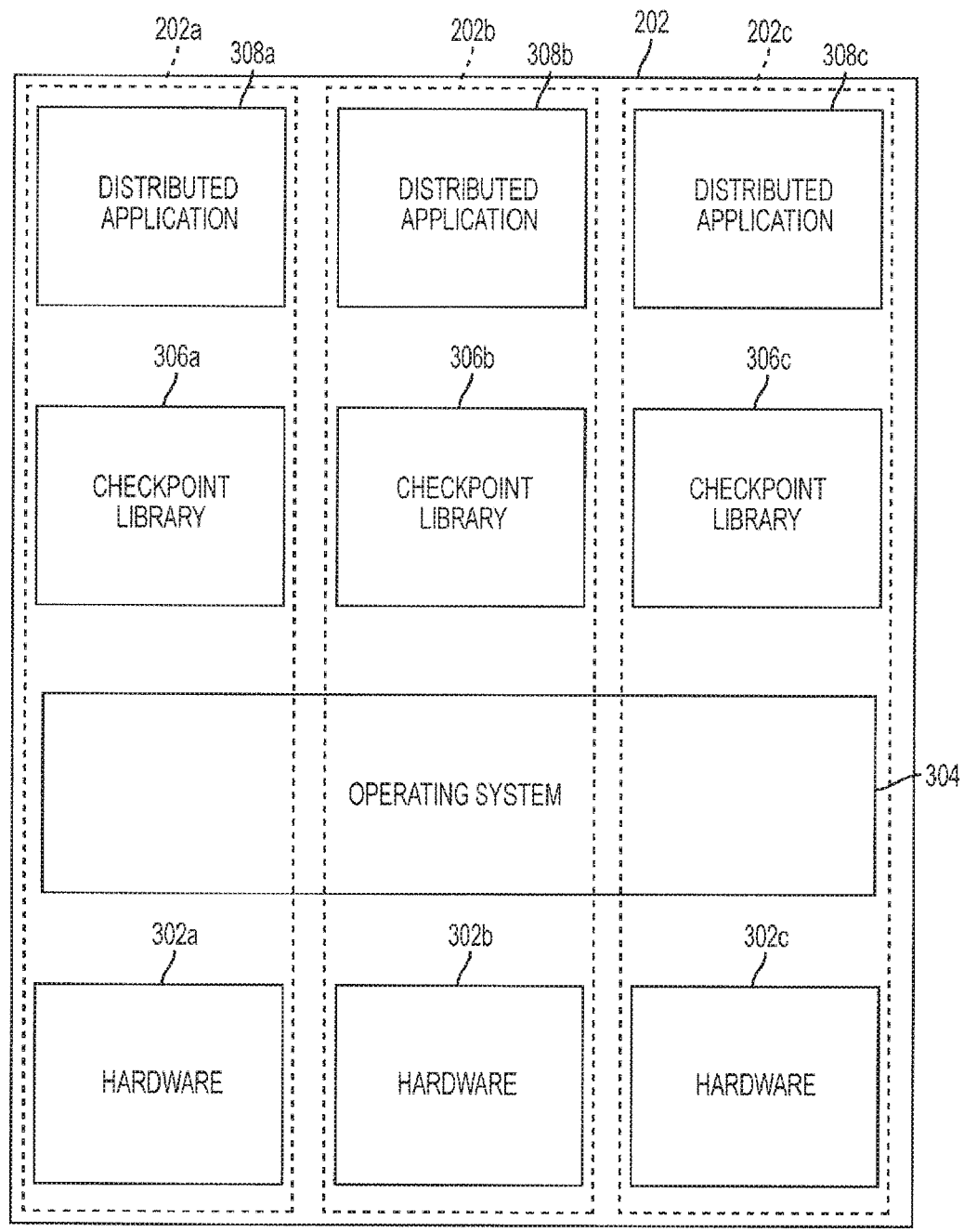
FIG. 4 is a conceptual block diagram illustrating another example of the communications layering for a processing node in a distributed system.

The same techniques just described can be extended to a processing node with a processor having two sub-processing entities as represented in FIG. 4. In this example, the processing node 102 is the distributed system and the sub-processing entities 202a-202c are the constituent components. The two requests to purchase the items are processed by different sub-processing entities 202a, 202b. A distributed application attempts to access the memory (not shown) to retrieve the state variable j. Since each distributed application 308a, 308b is running on separate hardware 302a, 302b, respectively, and share memory (not shown), a semaphore is likely to be used to manage access to the state variable j. A semaphore is a hardware or software flag, residing in the memory, which indicates the accessibility of the state variable j. A distributed application requiring access to the state variable j will read the semaphore to determine whether the state variable j is available. If the semaphore indicates that the state variable j is available, then the distributed application will set the semaphore to indicate that the memory space occupied by the state variable j is locked, thus preventing other applications from accessing the state variable.

In the event the distributed application 308a is able access the state variable j, the request processed by this distributed application 308a will be successful. As explained earlier, the state variable j will be loaded into a processor register (not shown) in the hardware 302a and the transaction consummated because the state variable j=1. Once the transaction is completed, the state variable j will be decremented (i.e., the state variable j=0) and written back to the memory. The checkpoint library 306a will take a checkpoint by recording the current state of the sub-processing entity 202a to non-volatile memory (not shown) in the processing node 102. The distributed application 308a will then send the confirmation to the computer making the request, and clear semaphore to unlock the memory space containing the state variable j. All other applications, including the distributed application 308b will be prohibited from accessing the state variable j while the semaphore is set.

Should the sub-processing entity 202a fail before the distributed application 308a confirms the transaction, a spare sub-processing entity 202c may be loaded with the state of the failed sub-processing entity 202a that existed just after the request to purchase the item was received, (i.e., the state of the failed sub-processing entity 202a when the last checkpoint was taken). In this state, the semaphore is not set, and therefore, the distributed application 308b, 308c may again compete for access to the semaphore in the memory. The result may or may not be the same as the pre-failure state, but whatever the result, the processing node 102 will obtain a globally consistent state because the consumer, whose request was being processed by the distributed application 308a in the failed sub-processing entity 202a did not transmit a confirmation that the transaction was successful.

Figure 5:
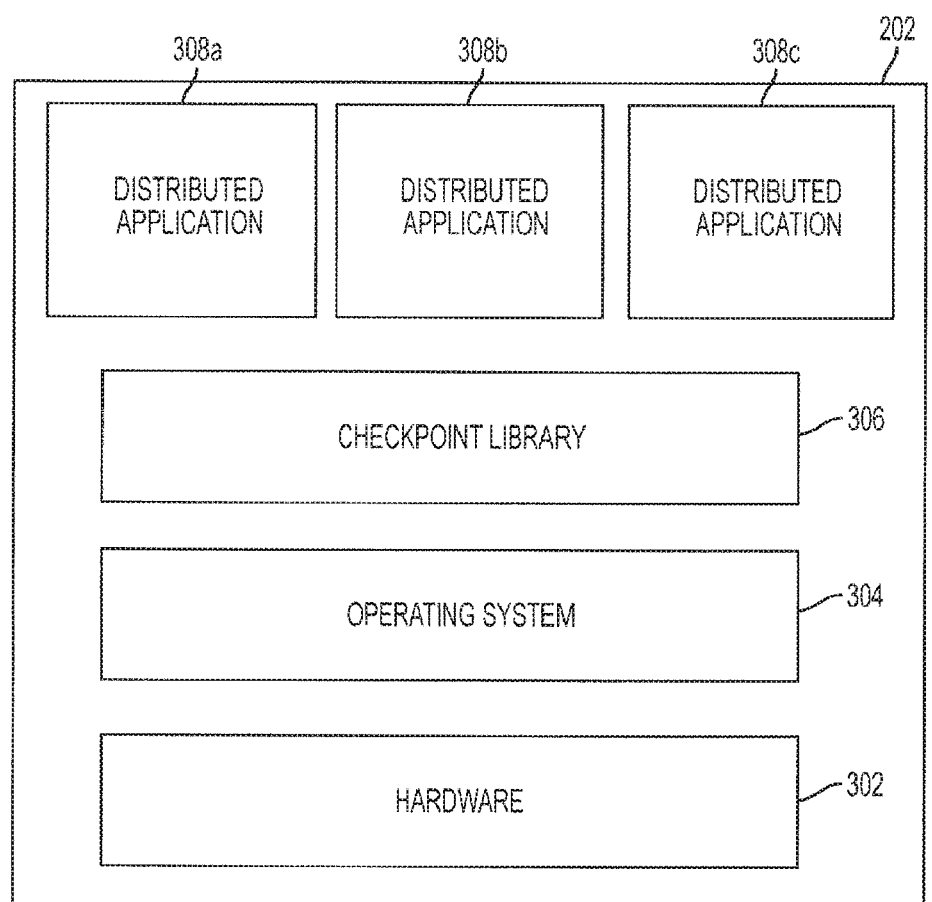
FIG. 5 is a conceptual block diagram illustrating yet another example of the communications layering for a processing node in a distributed system.

Another example will be provided where the processing node is the distributed system and the distributed applications are the constituent components. Referring to FIG. 5, a globally consistent state can reestablished after a distributed application fails without replaying the non-deterministic events internal to the distributed application as long as checkpoints are taken with every communication between the distributed application and the rest of the system.

In this example, the processor node 102 is executing first, second, and third distributed applications 308a-308c. The third distributed application 308c has first and second threads of execution, 508c.sub.x and 508c.sub.y, which share an index variable j, which may be stored in a general register (not shown). In response to a query by the first distributed application 308a to the first thread 308c.sub.x, the first thread 308c.sub.x will increment the variable j and send the resulting value back to the first distributed application 308a. In a similar manner, a query by the second distributed application 308b to the second thread 308c.sub.y causes the second thread 308c.sub.y to increment the variable j and send the resulting value back to the second distributed application 308b.

During execution, with j=0, it is possible that first distributed application 308a may query the first thread 308c, at the same time the second distributed application 308b queries the second thread 308c.sub.y. Once these queries are received, the checkpoint library 306 will take a checkpoint by recording the state of the third distributed application 308c in non-volatile memory (not shown). A scheduling entity in the operating system 304 may be used to determine which thread enters the synchronization primitive first. Assuming that it is the first thread 308c.sub.x, then the first distributed application 308a will receive j=1 and the second distributed application 308b will receive j=2. The checkpoint library 306 will take a checkpoint every time the third distributed application 308c it outputs the state variable j to either the first or second distributed application 308a, 308b, respectively.

Should the third distributed application 308c fail, the last checkpoint can be recovered from the non-volatile memory and used to roll back the third distributed application 308c to an error-free state. By way of example, if the third distributed application 308e fails before the state variables are sent to the first and second distributed applications 308a, 308b, respectively, then the third distributed application 308c will be rolled back to a state that existed just after receiving the queries from the first and second distributed applications 308a, 308b, respectively. When the distributed application 308c resumes operation from the last checkpoint, the scheduling entity in the operating system 304 may allow the second distributed application 308b to enter the synchronization primitive first. If this occurs, then the first distributed application 308a will receive j=2 and the second distributed application 308b will receive j=1. Although the result is different than the one that would have occurred had the third distributed application 308c not failed, it is still a globally consistent state because the current state of the variables j received by the first and second distributed applications 308a, 308b, respectively, are not inconsistent with any communication received from the third distributed application 308c received prior to failure.

The various techniques described throughout this disclosure provide an innovative way to integrate checkpoints with Log-Based Rollback-Recovery systems in such a manner that the PWD assumption can be relaxed so as only to require the recording of non-deterministic events that originate somewhere external to a component. These techniques allow the user to determine the set of the non-deterministic events that are to be recorded and replayed as determinants, and ignore the rest. A checkpoint is taken with any communication between the component and the rest of the system, and therefore, all non-determinism that could affect the rest of the system are captured.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. .sctn.112, sixth paragraph, unless the element is expressly recited using the phrase "means for" or, in the case of a method claim, the element is recited using the phrase "step for."

What is claimed:

1. A system for improved recovery by avoiding replaying of non-deterministic events, comprising:
   a storage medium;
   a hardware component configured to perform a process resulting in a transition of the hardware component through a series of states;
   a spare component capable of performing one or more operations of the hardware component;
   a recovery manager configured to respond to a failure of the hardware component after the hardware component has undergone at least one programmed and replayable non-deterministic event internal to a processing node of the hardware component since a most recent state of the hardware component being recorded in the storage medium, and before the non-deterministic event is communicated to other components external to the processing node, by recovering the most recent state of the hardware component recorded in the storage medium, independent of an operating system, and loading the recovered state into the spare component without the at least one non-deterministic event internal to the processing node being replayed and communicated to other components external to the processing node, wherein after the loading, the spare component is configured to continue to perform the process based on the recovered state.

2. The system of claim 1 wherein the hardware component is further configured to perform a process having multiple threads.

3. The system of claim 2 wherein at least two of the threads share a common state as the hardware component transitions through the series of states.

4. The system of claim 3 wherein the common state comprises an access by said at least two of the threads to a common resource.

5. The system of claim 1 wherein the hardware component is further configured to perform multiple processes in parallel, the processes resulting in the hardware component that transitions through the series of states.

6. The system of claim 5 wherein at least one of the processes comprises multiple threads.

7. The system of claim 5 wherein at least two of the processes share a common state as the hardware component transitions through the series of states.

8. The system of claim 7 wherein the common state comprises an access by said at least two of the processes to a common resource.

9. Non-transitory computer-readable media containing a set of program instructions executable by hardware in a component and a spare component of a system, the component being configured to perform improved recovery by avoiding replaying of non-deterministic events, comprising:
a recovery manager programmed to respond to a failure of the component after the component has undergone at least one programmed and replayable non-deterministic event internal to a processing node of the component since a most recent recording of a state of the component in a storage medium, and before the non-deterministic event is communicated to other components external to the processing node, by recovering the state of the component from the storage medium and loading the state in the spare component to continue performing a process based the recovered state without replaying the at least one programmed non-deterministic event and communicated to other components external to the processing node.

10. The computer-readable media of claim 9 wherein the component is further configured to execute multiple threads.

11. The computer-readable media of claim 10 wherein at least two of the threads share a common state as the component transitions through a series of states.

12. The computer-readable media of claim 11 wherein the common state comprises an access by said at least two of the threads to a common resource.

13. The computer-readable media of claim 9 wherein the component is further configured to perform multiple processes in parallel, the processes resulting in the component transitioning through a series of states.

14. The computer-readable media of claim 13 wherein at least one of the processes comprises multiple threads.

15. The computer-readable media of claim 14 wherein at least two of the processes share a common state as the component transitions through the series of states.

16. A method for improved recovery by avoiding replaying of non-deterministic events, comprising;
responding to a failure of a component after the component has undergone at least one programmed and replayable non-deterministic event internal to a processing node of the component since a most recent recording of a state of the component in a storage medium, and before the non-deterministic event is communicated to other components external to the processing node, by recovering a most recent state recorded in the storage medium, independent of an operating system and without replaying the at least one programmed non-deterministic event internal to the processing node and communicated to other components external to the processing node; and
loading the recovered state in a spare component configured to continue performing a process on the basis of the recovered state.

17. The method of claim 16, comprising performing a process having multiple threads.

18. The method of claim 17 wherein at least two of the threads share a common state as the component transitions through a series of states.

19. The method of claim 18 wherein the common state comprises accessing a common resource by said at least two of the threads.

20. The method of claim 18, comprising performing multiple processes in parallel, the processes resulting in the component transitioning through the series of states.

* * * * *